United States Patent [19]

Hathaway

[11] 4,354,341
[45] Oct. 19, 1982

[54] BRUSH CUTTER

[76] Inventor: Milton R. Hathaway, 40 Quarry Rd., Bolton, Conn. 06040

[21] Appl. No.: 268,687

[22] Filed: Jun. 1, 1981

[51] Int. Cl.³ ............................................. A01D 55/18
[52] U.S. Cl. ......................................... 56/503; 56/53; 56/320.1
[58] Field of Search .............. 56/503, 53, 320.1, 320.2

[56] References Cited

U.S. PATENT DOCUMENTS

| 2,952,109 | 9/1960 | Lambert | 56/53 |
| 3,115,741 | 12/1963 | Robinson | 56/503 |
| 3,457,714 | 7/1969 | Kamlukin | 56/503 |
| 3,608,290 | 9/1971 | Robinson | 56/503 |
| 3,673,779 | 7/1972 | Scarnato et al. | 56/503 |
| 4,112,656 | 9/1978 | Ranko et al. | 56/320.1 |
| 4,258,535 | 3/1981 | Jones et al. | 56/503 |

Primary Examiner—Jay N. Eskovitz
Attorney, Agent, or Firm—McCormick, Paulding & Huber

[57] ABSTRACT

A brush cutter with elevated brush engaging bar to keep brush bent away from brush cutter as cut is made. In one version the cutter comprises a circular saw blade driven from the power take-off at the front of a small two wheel drive tractor. In another version the cutter comprises a rotary lawn mower blade. The lawn mower housing preferably has a removable panel and a bar spaced above the portion of the housing normally covered by the panel.

1 Claim, 5 Drawing Figures

BRUSH CUTTER

This invention relates generally to brush cutters and deals more particularly with a shrouded brush cutting means and brush engaging bar. In one form the brush cutter comprises an attachment for a tractor having at least two driven wheels and a power take-off for operating brush cutting means associated with the attachment at the front of the tractor. In another form the brush cutter comprises a rotary lawn mower with improvements.

In one presently preferred form the invention is embodied in an attachment for a tractor and the attachment includes a housing for supporting the brush cutting means and a right angle drive unit in the top of the housing which is driven by the power take-off for operating the brush cutting means. The housing has laterally spaced skids to support the brush cutting means at a predetermined height above the ground, and the path of the brush cutting means is such that a forward portion of this path projects beyond the open forward end of the housing to permit cutting of brush by moving the tractor forwardly. A brush engaging bar is spaced above the housing and well above the path of the brush cutting means to engage the brush and bend the brush forwardly in response to this forward motion of the tractor, thereby opening the cut made in the brush by the brush cutting means, and avoiding the tendency for the brush cutting means to bind in the cut itself. In another preferred form the invention is embodied in a rotary lawn mower which has a removable panel at the front to allow the lawn mower blade to move in a path projecting outside the lawn mower housing. A bar is provided above the housing to engage the brush and bend the brush forwardly.

A general object of the present invention is to provide a brush cutting attachment for a tractor such that small trees and brush can be conveniently cleared, the stems or trunks of the brush being severed adjacent the ground with a brush cutting means such as a saw blade. The attachment includes means for bending the brush away from the cut made by the blade in order to avoid binding of the blade such as can be encountered in prior art brush cutting attachments of this general type.

Another object of the present invention is to provide a brush cutter in anotherwise conventional rotary lawn mower, which lawn mower has a brush engaging bar similar to that provided on the tractor attachment and which lawn mower has a blade adapted to cut brush.

Figure 1:
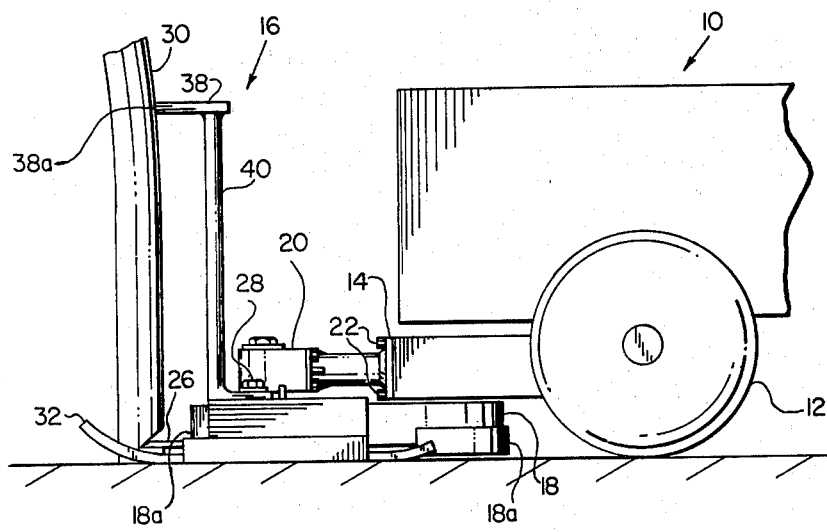
FIG. 1 is a side elevational view of a portion of a tractor having a power take-off suitable for attachment to a brush cutting attachment constructed in accordance with the present invention. Also shown is a small tree or brush trunk in the process of being cut by the attachment.
Figure 3:
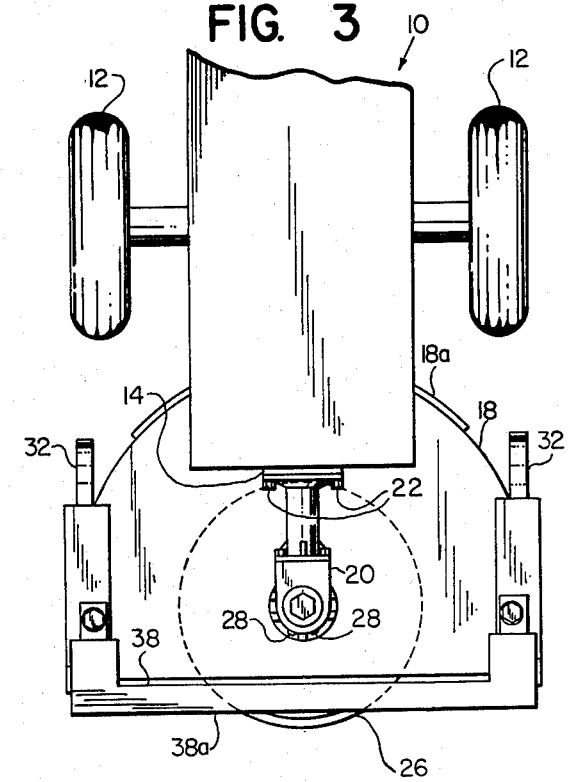
FIG. 3 is a plan view of the attachment illustrated in FIG. 2.

Turning now to the first sheet of the drawings in greater detail, a tractor 10 is illustrated with portions broken away in FIGS. 1 and 3, said tractor comprising a conventional component of the present disclosure. The tractor includes at least one pair of driven wheels 12, 12 selectively driven from an engine (not shown) by conventional control provided at the operators position at the rear of the tractor and including means for selectively driving a power take-off 14 projecting forwardly from underneath the front end of the tractor 10 as best shown in FIG. 1.

While any suitable tractor can be adapted for use with the brush cutting attachment to be described it has been found that a two wheel driven tractor of the type sold by Gravely of Clemmons, N.C. under their model No. 5265 or the equivalent is especially suitable for use with an attachment of the type to be described. The brush cutting attachment to be described is of generally similar weight and operating characteristics as attachments currently sold by that company. The basic skills necessary to operate such attachments are well within the skills of any tractor operator generally, and the attachment described herein is no more complicated to mount on a tractor than the attachments currently sold by Gravely for mowing, snow blowing, snow plowing, sweeping, plowing and cultivating. The brush cutting attachment to be described can be assembled with such a tractor in about the same length of time as that required in the simplest of above mentioned conventional attachments.

Figure 2:
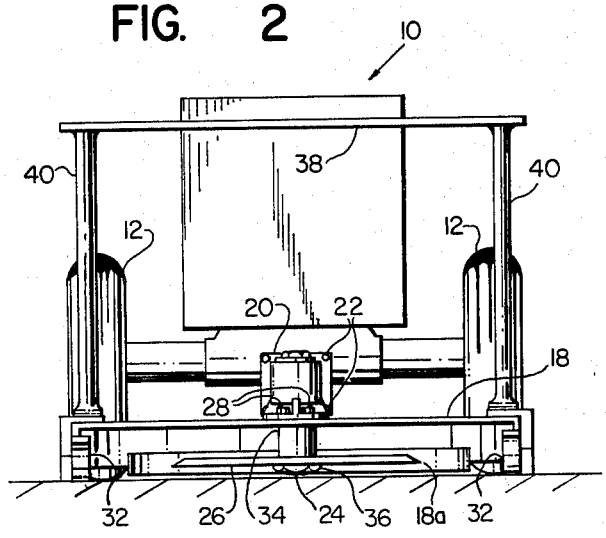
FIG. 2 is a front view of the attachment illustrated in FIG. 1.

The brush cutting attachment indicated generally at 16 in FIG. 1 includes a housing 18 having a generally circular configuration as viewed from above in FIG. 3, and having an open front end as best shown in FIG. 2. The rear edge of housing 18 is preferably fitted with a rubber or vinyl shield similar to that found on present day rotary lawn mowers. A right angle drive unit 20 is provided in the upper wall or top of the housing 18 and is adapted for attachment to the output end of the power take-off 14 by fasteners as shown at 22. A vertically oriented drive shaft 24 extends downwardly inside the housing 18 so as to operate a brush cutting means in the form of a circular saw blade 26. The right angle drive unit 20 is secured to this top wall of the housing 18 by fasteners 28, 28 and the blade 26 is adapted to rotate in response to rotation of the power take-off output shaft so that the path of the blade 26 includes a forward portion projecting forwardly beyond the forward edge of the housing 18 as best shown in FIG. 1. The forward edge of the housing 18 is indicated generally at 18a in this view, and blade 26 is shown in the process of cutting an upright brush element 30.

Still with reference to the housing 18 skids 32, 32 are provided in laterally spaced relationship to the path of the blade 26 and are supported or mounted to the sides of the housing 18 so as to stabilize the path of rotation for the blade 26 and to maintain the present height of the blade above the ground as best shown in FIG. 2. The actual height of the blade above the ground in the configuration shown may be varied by providing spacers of varying thickness between the blade and a shoulder (not shown) on the shaft 24 one such spacer being illustrated at 34 in FIG. 2. A threaded nut 36 may be provided for securing the blade 26 on the shaft 24 and in turn supporting the spacer 34 between the top of blade 26 and such a shoulder on the shaft 24.

A brush engaging member 38 is provided in spaced relationship above the path of the blade 26 and said member includes a forward edge which is also spaced forwardly of the housing edge 18a. This member 38 has its forward edge 38a located horizontally quite closely to that portion of the blade which projects beyond the forward edge 18a of the housing, as best shown in FIG. 3. Thus, the forward edge 38a of member 38 is so located with respect to the cutting edge of the blade 26 as to achieve the slight degree of bending of the tree stem 30 in order to avoid binding of the blade 26 in the cut made thereby at the base of the tree. The member 38 preferably comprises a horizontally extending bar having its laterally spaced end portions connected to upright support members 40, 40. The lower ends of these supports 40, 40 are mounted to the housing in the general area of the mounting for skids described previously.

As so constructed and arranged the operator or the tractor 10 can position himself in a conventional fashion at the rear of the tractor (not shown) to operate the tractor and to cause the wheels 12 to rotate in a direction to move said tractor forwardly into the brush as suggested at 30 in FIG. 1 in order that the bar 38 engage the brush 30 bend it forwardly in the manner shown with the result that the rotating blade 26 will sever the stem of the brush 30 without any tendency for the blade to bind in the saw cut itself. The operator of the tractor will be close enough to his work to aim the tractor into the brush to be cut without exposing himself to any debris or wood chips caused by the cutting operation. Further, the stems of the brush 30 are adapted to be severed at a point close to the ground with the result that the tractor wheels 12 can readily pass over the severed stumps. These stumps will be cut parallel to the ground as a result of the unique blade support in the brush cutting attachment described herein with the further advantage that the pneumatic tires commonly provided on such a tractor will not tend to suffer unnecessary damage as a result of being moved over the severed brush stumps left in the ground after employing the improved attachment as described above. The brush cutting blade is preferably provided in substantially the same plane as that defined by the lower edge of the housing 18 (as best shown in FIG. 2). This geometry will permit the two wheel tractor 10 to be maneuvered over the severed stump of the brush 30.

Figure 4:
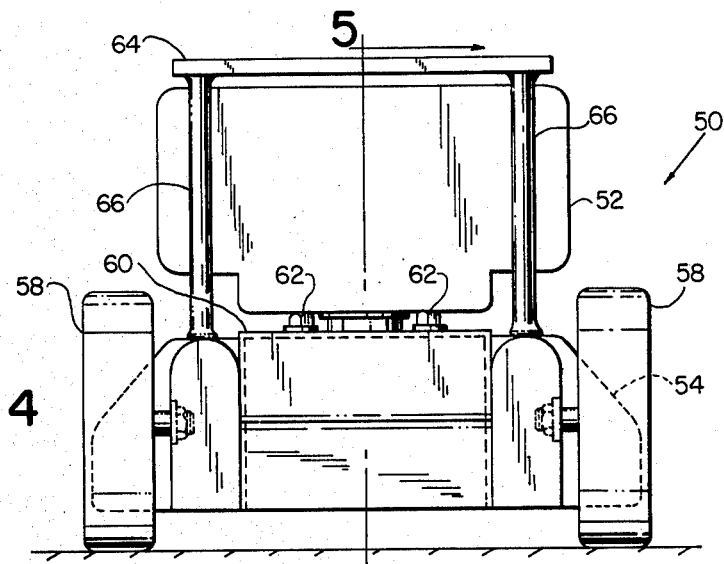
FIG. 4 is a front view of a rotary lawn mower constructed in accordance with the present invention.
Figure 5:
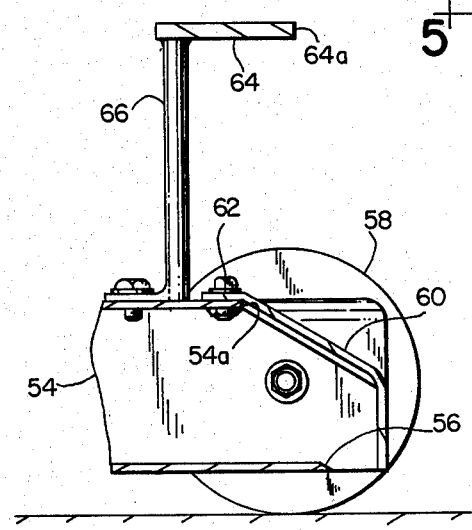
FIG. 5 is a vertical sectional view taken generally on the line 5—5 of FIG. 4.

Turning next to the second sheet of drawings a rotary lawn mower 50 is shown in FIGS. 4 and 5. An engine 52 is mounted on housing 54 and a vertical crank shaft (not shown) for driving rotary cutting blade 56 in a conventional manner. The mower may be adapted for hand pushing by a conventional handle (not shown) or may be adapted for attachment to a tractor of the type described above. In the version shown four wheels 58, 58 are provided to support the housing 54 and blade 56 as the apparatus is moved across the ground to either cut grass or brush.

In cutting brush it is advantageous to remove a front panel 60, held in place by fasteners 62, 62. This will expose a forward portion of the path of blade 56 and permit the lawn mower to be moved into small brush for brush clearing in much the same manner as described above with reference to the attachment for the tractor.

A brush engaging bar 64 is provided on supports 66, 66 and in spaced relationship above the path of the blade 56 and its forward edge is preferable spaced forwardly of the edge 54a of the housing 54. This brush engaging bar 64, like the member 38 described above, has its forward edge 64a located in horizontally close relationship to that portion of the blade path which projects beyond the edge 54a of the housing. This geometry will prevent binding of rotary blade 56 in the cut made by the blade in the brush.

Although blade 56 may comprise a conventional lawn mower blade of the propeller type, it will be apparent that this blade could comprise a disc type blade as described above with reference to the tractor attachment of FIGS. 1-3.

I claim:

1. A brush cutting attachment for a tractor equipped with a power take-off shaft projecting forwardly of the tractor, said attachment comprising a right angle drive unit, a generally vertical shaft which is oriented at right angles to and driven by said power take-off shaft through said right angle drive unit, a housing pendulously supported by said right angle drive unit and with said vertical shaft extending downwardly into said housing, said housing having a front opening spaced forwardly of said vertical shaft, laterally spaced ground engageable skids for supporting said housing at locations spaced on either side of said vertical shaft, a single rotary saw blade in said housing so arranged that a portion only of its periphery defines an arcuate cutting path passing through said housing opening, means for adjustably mounting said saw blade vertically on said vertical shaft, a horizontal laterally extending brush engageable bar located above said housing and having its leading edges spaced forwardly of said housing opening, said leading edge oriented in a vertical plane which is perpendicular to said power take-off shaft and located just inside the most forward peripheral portion of said saw blade to achieve at least some bending of the brush after the blade contacts the brush and before the blade binds in the brush.

* * * * *